(12) United States Patent
Suzuki

(10) Patent No.: US 7,737,078 B2
(45) Date of Patent: Jun. 15, 2010

(54) CATALYST FOR PURIFYING EXHAUST GAS

(75) Inventor: Hiromasa Suzuki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 105 days.

(21) Appl. No.: 11/791,986

(22) PCT Filed: Dec. 1, 2005

(86) PCT No.: PCT/JP2005/022515

§ 371 (c)(1),
(2), (4) Date: May 31, 2007

(87) PCT Pub. No.: WO2006/059799

PCT Pub. Date: Jun. 8, 2006

(65) Prior Publication Data

US 2008/0214390 A1    Sep. 4, 2008

(30) Foreign Application Priority Data

Dec. 3, 2004    (JP) .............................. 2004-351276

(51) Int. Cl.
*B01J 23/00* (2006.01)
*B01J 21/00* (2006.01)
*B01J 20/00* (2006.01)

(52) U.S. Cl. .................. 502/329; 502/242; 502/249; 502/253; 502/261; 502/262; 502/326; 502/327; 502/332; 502/333; 502/334; 502/339; 502/340; 502/341; 502/342; 502/343; 502/349; 502/350; 502/351; 502/352; 502/353; 502/354; 502/355; 502/415; 502/439

(58) Field of Classification Search ............... 502/326, 502/327, 329, 332, 334, 339, 342, 343, 352, 502/353, 354, 439, 242, 249, 253, 261, 262, 502/333, 340, 341, 349, 350, 355, 415, 351
See application file for complete search history.

(56) References Cited

U.S. PATENT DOCUMENTS 3,397,154 A * 8/1968 Talsma ...................... 502/304

(Continued)

FOREIGN PATENT DOCUMENTS

DE    38 30 319    7/1989

(Continued)

OTHER PUBLICATIONS

Extended European Search Report dated Oct. 27, 2009 for EP Application No. 05814418.9.

*Primary Examiner*—Cam N Nguyen
(74) *Attorney, Agent, or Firm*—Finnegan, Henderson, Farabow, Garrett & Dunner, LLP

(57) ABSTRACT

The formation of $H_2S$ in a stoichiometric or reducing atmosphere is restrained without using Ni or Cu as an environmental load substance. An additional oxide composed of an oxide of at least one kind of metal selected from the group consisting of Bi, Sn and Zn was added to a three-way catalyst for purifying an exhaust gas emitted from an internal combustion engine of which the combustion is controlled in near a stoichiometric atmosphere in the amount of from 0.02 mol to 0.2 mol per liter of the catalyst. The additional oxide forms $SO_3$ or $SO_4$ from $SO_2$ in an oxidizing atmosphere, and stores sulfur components as a sulfide in a reducing atmosphere so that emission of $H_2S$ can be restrained. And since no environmental load substance is contained, the catalyst can be used safely.

5 Claims, 2 Drawing Sheets

○ : $Bi_2O_3$ added Embodiment and Reference example
● : $Bi_2O_3$ added Comparative example 2
▲ : $SnO_2$ added Embodiment and Reference example
▲ : $SnO_2$ added Comparative example 3
□ : ZnO added Embodiment and Reference example
■ : ZnO added Comparative example 4
▽ : Compositely added Embodiment
▼ : Compositely added Comparative example 5

U.S. PATENT DOCUMENTS

| | | | |
|---|---|---|---|
| 3,511,888 A * | 5/1970 | Jenkins | 585/419 |
| 3,692,701 A * | 9/1972 | Box, Jr. | 502/329 |
| 3,919,120 A | 11/1975 | Kato et al. | |
| 3,939,220 A * | 2/1976 | Rausch | 585/379 |
| 4,061,592 A * | 12/1977 | Buss | 502/239 |
| 4,082,697 A * | 4/1978 | Tamm | 502/334 |
| 4,169,815 A * | 10/1979 | Drehman | 502/329 |
| 4,210,561 A * | 7/1980 | Antos | 502/226 |
| 4,786,625 A * | 11/1988 | Imai et al. | 502/326 |
| 5,059,574 A * | 10/1991 | Abrevaya | 502/261 |
| 5,105,032 A * | 4/1992 | Holbrook et al. | 570/101 |
| 5,430,220 A * | 7/1995 | Khare et al. | 585/660 |
| 5,877,369 A * | 3/1999 | Wu et al. | 585/419 |
| 5,892,102 A * | 4/1999 | Mikami et al. | 560/210 |
| 5,898,011 A * | 4/1999 | Wu et al. | 502/60 |
| 5,911,961 A | 6/1999 | Horiuchi et al. | |
| 5,935,529 A * | 8/1999 | Saito et al. | 422/177 |
| 6,017,844 A * | 1/2000 | Wu et al. | 502/214 |
| RE37,663 E * | 4/2002 | Golunski et al. | 502/339 |
| 6,482,766 B1 * | 11/2002 | Chaumette et al. | 502/242 |
| 6,685,899 B1 | 2/2004 | Park | |
| 7,125,822 B2 * | 10/2006 | Nakano et al. | 502/339 |
| 7,153,807 B2 * | 12/2006 | Molinier et al. | 502/177 |
| 7,235,507 B2 * | 6/2007 | Xu et al. | 502/63 |
| 2002/0045544 A1 * | 4/2002 | Le Peltier et al. | 502/325 |
| 2005/0131255 A1 * | 6/2005 | Benderly et al. | 562/546 |
| 2006/0030481 A1 * | 2/2006 | LaBarge et al. | 502/324 |

FOREIGN PATENT DOCUMENTS

| | | |
|---|---|---|
| EP | 0 532 024 | 3/1993 |
| EP | 1 312 413 | 5/2003 |
| JP | 61-20342 | 5/1986 |
| JP | 2-20561 | 5/1990 |
| JP | 05-81521 | 11/1993 |
| JP | 09-075739 | 3/1997 |
| JP | 11-005035 | 1/1999 |
| JP | 2002-336703 | 11/2002 |

* cited by examiner

Fig. 1

○ : $Bi_2O_3$ added Embodiment and Reference example
● : $Bi_2O_3$ added Comparative example 2
△ : $SnO_2$ added Embodiment and Reference example
▲ : $SnO_2$ added Comparative example 3
□ : ZnO added Embodiment and Reference example
■ : ZnO added Comparative example 4
▽ : Compositely added Embodiment
▼ : Compositely added Comparative example 5

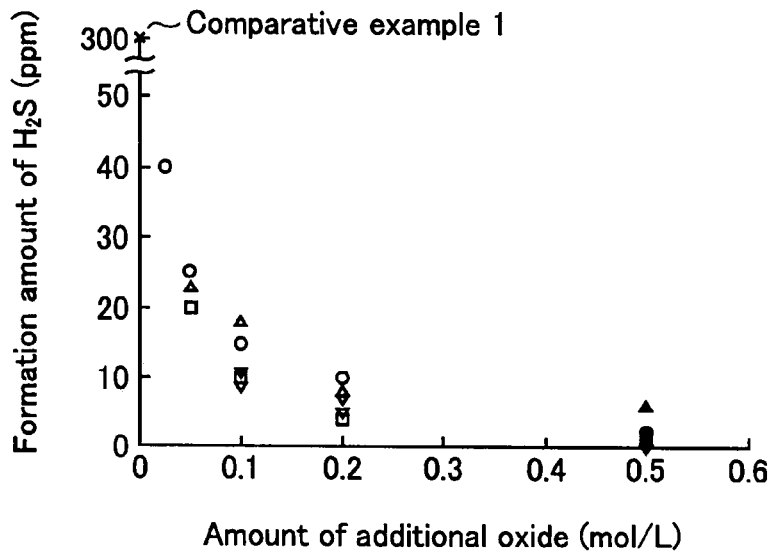

Fig. 2

○ : $Bi_2O_3$ added Embodiment and Reference example
● : $Bi_2O_3$ added Comparative example 2
△ : $SnO_2$ added Embodiment and Reference example
▲ : $SnO_2$ added Comparative example 3
□ : ZnO added Embodiment and Reference example
■ : ZnO added Comparative example 4
▽ : Compositely added Embodiment
▼ : Compositely added Comparative example 5

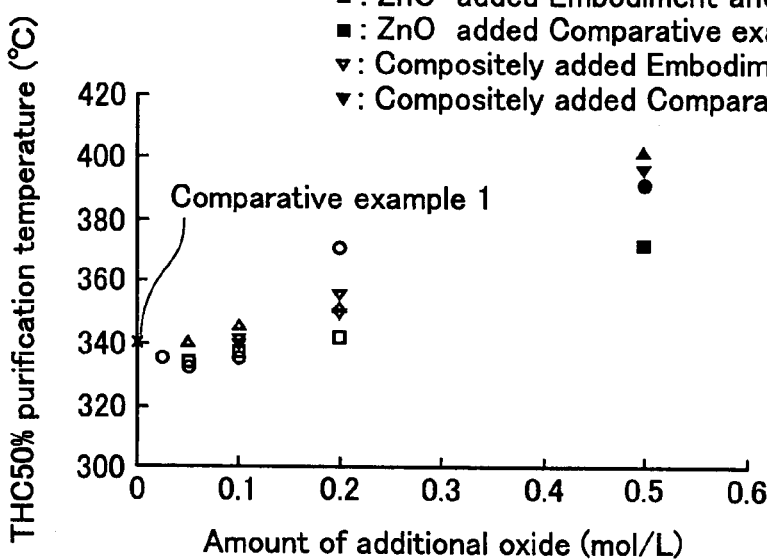

CATALYST FOR PURIFYING EXHAUST GAS

TECHNICAL FIELD

The present invention relates to a catalyst (three-way catalyst) for purifying an exhaust gas emitted from an internal combustion engine of which combustion is controlled in a stoichiometric atmosphere, and more particularly, to a catalyst for purifying an exhaust gas, which is capable of restraining emission of hydrogen sulfide ($H_2S$).

BACKGROUND ART

The three-way catalyst has been widely used as the catalyst for purifying HC, CO and $NO_x$ in an exhaust gas from a motor vehicle. The three-way catalyst is composed of a porous oxide support such as alumina, ceria, zirconia, ceria-zirconia, etc., which supports platinum group metals, such as Pt, Rh, etc. The three-way catalyst oxidizes HC and CO and reduces $NO_x$ to purify these components. These reactions proceed most efficiently in such an atmosphere that oxidation components and reduction components exist in an approximately equivalent amount, and consequently, in the motor vehicles on which the three-way catalysts are mounted, the air-fuel ratio has been controlled such that combustion is carried out at about the theoretical air-fuel ratio (stoichiometric air-fuel ratio) (A/F=about 14.6±0.2).

The three-way catalyst, however, exhibits the problem that when an exhaust gas atmosphere shifts to a reducing side, sulfur oxide in the exhaust gas is reduced and emitted as $H_2S$. Accordingly, it can be considered to additionally use oxide of Ni or Cu as a component of the three-way catalyst. Oxide of Ni or Cu forms $SO_3$ or $SO_4$ from $SO_2$ in an oxidizing atmosphere, and stores sulfur components as sulfides such as $Ni_2S_3$, ex. in a reducing atmosphere, thereby restraining emission of $H_2S$.

However, Ni or Cu is an environmental load substance putting so that, recently, there is the tendency of limiting the use thereof as the component of the catalyst for purifying an exhaust gas of a motor vehicle.

Publications of examined Japanese patent applications Nos. Hei02-020561, Hei05-081521, Sho61-020342, etc. disclose catalysts, each containing bismuth components and being capable of oxidizing $H_2S$ to eliminate the same. These catalysts, however, oxidize $H_2S$ in an oxidizing atmosphere so that, in the stoichiometric or reducing atmosphere, $H_2S$ may be emitted. These publications do not disclose the effects in the stoichiometric or reducing atmosphere, and neither disclose nor suggest the application of these catalysts to the three-way catalysts which are used in the stoichiometric or reducing atmosphere, too.

In addition, publications of unexamined Japanese patent applications Nos. Hei09-075739, Hei11-005035, etc. disclose catalysts in which porous oxides containing zinc oxide, tin oxide, etc. in addition to alumina, zirconia, etc. support platinum group metals. However, these catalysts have been used in exhaust gases containing not less than the theoretical reaction amount of oxygen so that they cannot be considered to be applied to the three-way catalysts.

[Patent Document 1] Publications of examined Japanese patent applications Nos. Hei02-020561

[Patent Document 2] Publications of examined Japanese patent applications Nos. Hei05-081521

[Patent Document 3] Publications of examined Japanese patent applications Nos. Sho61-020342

[Patent Document 4] Publications of unexamined Japanese patent applications Nos. Hei09-075739

[Patent Document 5] Publications of unexamined Japanese patent applications Nos. Hei11-005035

DISCLOSURE OF THE INVENTION

Problems that the Invention is to Solve

The present invention has been made in view of the above-described circumstances, and has an object of providing a catalyst for purifying an exhaust gas, which is capable of restraining emission of $H_2S$ even in a stoichiometric or reducing atmosphere without using Ni or Cu as an environmental load substance.

Means of Solving the Problems

The catalyst for purifying an exhaust gas in accordance with the present invention is characterized in that the catalyst purifies the exhaust gas emitted from an internal combustion engine of which the combustion is controlled at about a stoichiometric atmosphere, and that the catalyst contains a platinum group metal, a porous oxide and an additional oxide composed of oxide of at least one kind of metal selected from the group consisting of Bi, Sn and Zn, and the additional oxides are contained in the amount of from 0.02 mol to 0.2 mol per litter of the catalyst.

It is more preferable that the additional oxide is composed of oxides of at least two metals selected from the group of Bi, Sn and Zn.

And it is preferable that the ratio (R) of the molar content of the porous oxide to the molar content of the additional oxide (R=molar amount of porous oxide/molar amount of additional oxide) is in the range of 8<R<72, more preferably in the range of 12<R<45.

Effects of the Invention

With the catalyst for purifying an exhaust gas in accordance with the present invention, the additional oxide forms $SO_3$ or $SO_4$ from $SO_2$ in an oxidizing atmosphere, and stores sulfur components as sulfides in a reducing atmosphere so that emission of $H_2S$ can be restrained. In addition, since no environmental load substance is contained, the catalyst can be used safely.

BRIEF DESCRIPTION OF THE DRAWINGS

FIG. 1 is a graph showing the formation amount of $H_2S$ relative to the addition amount of additional oxide.

FIG. 2 is a graph showing the THC 50% purification temperature relative to the addition amount of additional oxide.

BEST MODE FOR CARRYING OUT THE INVENTION

Figure 3:
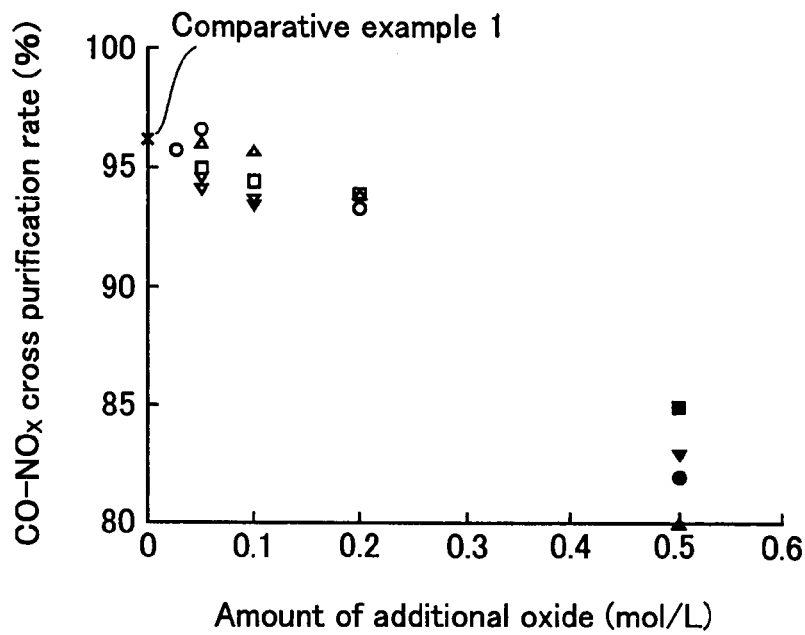
FIG. 3 is a graph showing the CO—$NO_x$ cross purification rate relative to the addition amount of additional oxide.

The catalyst for purifying an exhaust gas in accordance with the present invention contains a platinum group metal, a porous oxide and an additional oxide. Namely, the catalyst in accordance with the present invention contains the additional oxide in addition to the conventional three-way catalyst. The porous oxide functions as a conventional catalyst support, examples thereof include alumina, silica, titania, ceria, zirconia or composite oxides composed of a plurality of these materials, such as a ceria-zirconia solid solution, and one or more of the above oxides can be used. It is desirable to contain at least activated alumina with a great specific surface area. And where the oxide exhibiting an oxygen absorbing and releasing ability, such as ceria, a ceria-zirconia solid solution, etc. is used, variations in the atmosphere can be made gentle to further improve the three-way activity.

Oxide of at least one kind of metal selected from the group consisting of Bi, Sn, and Zn can be used as the additional oxide. Only one kind of metal out of these metals may be used, or two kinds or three kinds of metals may be used together. By adding two kinds of oxides together, the formation amount of $H_2S$ further decreases, as compared to the case one additional oxide is added by the same amount.

The additional oxide is added to the catalyst in the amount of 0.02 mol to 0.2 mol per liter of the catalyst. Where the additional oxide is greater than 0.2 mol/L, the formation amount of $H_2S$ further decreases, but the three-way activity lowers so that the practical purification performance cannot be effected. In order to restrain the formation of $H_2S$, it is desirable to add the additional oxides by the amount as great as possible within the above-described range, whereas in order to improve the three-way activity, it is desirable to add the additional oxides by the amount as small as possible within the above-described range.

The range of 0.02 mol to 0.2 mol per liter of the catalyst depends on the coating amount of a catalyst layer. Accordingly, if expressed by relative values, it is desirable that the ratio (R) of the molar content of the porous oxide to the molar content of the additional oxide (R=molar content of porous oxide/molar content of additional oxide) is in the range of 8<R<72. Where R is 8 or less, the formation amount of $H_2S$ further decreases but the three-way activity lowers so that practical purifying performance cannot be effected. In addition, where R is 72 or more, it becomes difficult to restrain the formation of $H_2S$. The range of 12<R<45 is particularly desirable.

Metals which oxidize HC and CO or reduce $NO_x$ with their catalytic actions are used as the platinum group metal. Representative examples thereof are Pt, Rh, Pd, etc. It is also preferable to use Pt exhibiting excellent oxidizing activity and Rh exhibiting excellent reducing activity together. The platinum group metal may be partly supported on the additional oxide, but it is desirable that the most part of the platinum group metal is supported on the porous oxide.

The supporting amount of the platinum group metal may be similar to that of the conventional three-way catalyst, and varies according to the kind of metal, but it is preferable to range from 0.1 to 10 g per liter of the catalyst.

The catalyst for purifying an exhaust gas in accordance with the present invention may have a pellet-shaped, honeycomb-shaped or foam-shaped configuration. In the case of the catalyst having a honeycomb-shaped configuration, ex., a honeycomb substrate composed of cordierite, metal, etc. may be wash-coated with a slurry containing the porous oxide and the additional oxide, and calcined to form a coat layer, and the coat layer is made to support the platinum group metal with the adsorption supporting method or the water-absorption supporting method.

Alternatively, a catalyst powder in which the porous oxide previously supports the platinum group metal is prepared, and the additional oxide is mixed to the prepared catalyst powder to form a coat layer, thereby preparing a catalyst in accordance with the present invention The additional oxide can be added by physically mixing with the porous oxide, but can be also added with the sol-gel method, coprecipitation method, etc. For example, it is also possible to prepare the additional oxide by depositing a precipitate from an aqueous solution of a water soluble compound such as nitrate of at least one kind of metal which is selected from the group consisting of Bi, Sn and Zn, making alumina powder, etc. support the deposited precipitate, and calcining the same.

EMBODIMENTS

Hereinafter, the present invention will be explained specifically based on embodiments and comparative examples.

Embodiment 1

120 parts by weight of an activated alumina powder, 75 parts by weight of a ceria-zirconia solid solution powder (molar ratio $CeO_2:ZrO_2:Y_2O_3=65:30:5$), 11.5 parts by weight of bismuth oxide ($Bi_2O_3$), 3 parts by weight of alumina hydrate as a binder, and 44 parts by weight of alumina nitrate as another binder were mixed with a predetermined amount of a pure water, and subjected to a milling operation to prepare a slurry. The ratio (R) of the total molar amount of activated alumina and a ceria-zirconia solid solution to the molar amount of bismuth oxide is 67.2.

Next, a honeycomb substrate composed of cordierite (volume: 1.1 L, diameter: 103 mm, length: 130 mm, cell density: 400 cpsi, wall thickness: 100 µm) was prepared, wash-coated with the above-described slurry, dried at 120° C. and calcined at 650° C. for 3 hours to form a coat layer. The coat layer was formed in the amount of 210 g per liter of the honeycomb substrate, and bismuth oxide was contained in the amount of 0.025 mol per liter of the honeycomb substrate.

Then, the honeycomb substrate having the above-described coat layer was immersed in an aqueous solution of rhodium nitrate having a predetermined concentration for adsorbing and supporting the same, taken from the aqueous solution, dried at 120° C., and calcined at 500° C. for 1 hour to support Rh. Furthermore, the honeycomb substrate was impregnated with a predetermined amount of a solution of diammine dinitro platinum having a predetermined concentration for absorbing water and supporting the same, dried at 120° C. and calcined at 500° C. for 1 hour to support Pt. The amount of Pt supported per liter of the honeycomb substrate is 1.0 g, whereas the amount of Rh supported per liter of the honeycomb substrate is 0.2 g.

Comparative Example 1

A slurry was prepared similarly to Embodiment 1 except that bismuth oxide powder was not used, a coat layer was formed similarly to Embodiment 1 using the prepared slurry, and Rh and Pt were supported thereon similarly.

Embodiment 2

A slurry was prepared similarly to Embodiment 1 except that 23 parts by weight of bismuth oxide powder was used, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of bismuth oxide is 33.2, and bismuth oxide is contained in the amount of 0.05 mol per liter of the honeycomb substrate.

Embodiment 3

A slurry was prepared similarly to Embodiment 1 except that 46 parts by weight of bismuth oxide powder was used, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of bismuth oxide is 16.8, and bismuth oxide is contained in the amount of 0.1 mol per liter of the honeycomb substrate.

Embodiment 4

A slurry was prepared similarly to Embodiment 1 except that 92 parts by weight of bismuth oxide powder was used, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of bismuth oxide is 8.4, and bismuth oxide is contained in the amount of 0.2 mol per liter of the honeycomb substrate.

Comparative Example 2

A slurry was prepared similarly to Embodiment 1 except that 230 parts by weight of bismuth oxide powder was used, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of bismuth oxide is 3.4, and bismuth oxide is contained in the amount of 0.5 mol per liter of the honeycomb substrate.

Embodiment 5

A slurry was prepared similarly to Embodiment 1 except that 7.5 parts by weight of tin oxide ($SnO_2$) powder was used in place of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of tin oxide is 33.4, and tin oxide is contained in the amount of 0.05 mol per liter of the honeycomb substrate.

Embodiment 6

A slurry was prepared similarly to Embodiment 1 except that 15 parts by weight of tin oxide powder was used in place of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of tin oxide is 16:7, and tin oxide is contained in the amount of 0.1 mol per liter of the honeycomb substrate.

Embodiment 7

A slurry was prepared similarly to Embodiment 1 except that 30 parts by weight of tin oxide powder was used in place of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of tin oxide is 8.3, and tin oxide is contained in the amount of 0.2 mol per liter of the honeycomb substrate.

Comparative Example 3

A slurry was prepared similarly to Embodiment 1 except that 75 parts by weight of tin oxide powder was used in place of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of tin oxide is 3.3, and tin oxide is contained in the amount of 0.5 mol per liter of the honeycomb substrate.

Embodiment 8

A slurry was prepared similarly to Embodiment 1 except that 4 parts by weight of zinc oxide (ZnO) powder was used in place of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of zinc oxide is 33.8, and zinc oxide is contained in the amount of 0.05 mol per liter of the honeycomb substrate.

Embodiment 9

A slurry was prepared similarly to Embodiment 1 except that 8 parts by weight of zinc oxide powder was used in place of bismuth oxide powder. A coat layer was formed similarly to Embodiment 1 using the prepared slurry, and Rh and Pt were carried thereon similarly.

The ratio (R) of the total molar amount of activated alumina and a ceria-zirconia solid solution to the molar amount of zinc oxide is 16.9, and zinc oxide is contained in the amount of 0.1 mol per liter of the honeycomb substrate.

Embodiment 10

A slurry was prepared similarly to Embodiment 1 except that 16 parts by weight of zinc oxide powder was used in place of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of zinc oxide is 8.4, and zinc oxide is contained in the amount of 0.2 mol per liter of the honeycomb substrate.

Comparative Example 4

A slurry was prepared similarly to Embodiment 1 except that 40 parts by weight of zinc oxide powder was used in place of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the molar amount of zinc oxide is 3.4, and zinc oxide is contained in the amount of 0.49 mol per liter of the honeycomb substrate.

Embodiment 11

A slurry was prepared similarly to Embodiment 1 except that 7.5 parts by weight of tin oxide powder was used in addition to 23 parts by weight of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the total molar amount of bismuth oxide and tin oxide is 67.0, and bismuth oxide and tin oxide are contained in the amount of 0.05 mol, respectively, and 0.1 mol in total, per liter of the honeycomb substrate.

Embodiment 12

A slurry was prepared similarly to Embodiment 1 except that 8 parts by weight of zinc oxide powder was used in addition to 46 parts by weight of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the total molar amount of bismuth oxide and zinc oxide is 33.7, and bismuth oxide and zinc oxide are contained in the amount of 0.1 mol, respectively, and 0.2 mol in total, per liter of the honeycomb substrate.

Embodiment 13

A slurry was prepared similarly to Embodiment 1 except that 15 parts by weight of tin oxide powder was used in addition to 46 parts by weight of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the total molar amount of bismuth oxide and tin oxide is 33.5, and bismuth oxide and tin oxide are contained in the amount of 0.1 mol, respectively, and 0.2 mol in total, per liter of the honeycomb substrate.

Embodiment 14

A slurry was prepared similarly to Embodiment 1 except that 7.5 parts by weight of tin oxide powder and 4 parts by weight of zinc oxide powder were used in place of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the total molar amount of tin oxide and zinc oxide is 67.1, and tin oxide and zinc oxide are contained in the amount of 0.05 mol, respectively, and 0.1 mol in total, per liter of the honeycomb substrate.

Comparative Example 5

A slurry was prepared similarly to Embodiment 1 except that 30 parts by weight of tin oxide powder was used in addition to 138 parts by weight of bismuth oxide powder, a coat layer was formed similarly to Embodiment 1 using the prepared slurry, and Rh and Pt were supported thereon similarly.

The ratio (R) of the total molar amount of activated alumina and a ceria-zirconia solid solution to the total molar amount of bismuth oxide and tin oxide is 13.9, and bismuth oxide and tin oxide are contained in the amount of 0.3 mol and 0.2 mol, respectively, and 0.5 mol in total, per liter of the honeycomb substrate.

Tests and Evaluation (Test on Formation Amount of $H_2S$)

The catalysts of each embodiment and each comparative example were respectively mounted on a vehicle equipped with a 2.4 L, in-line four-cylinder engine as an underfloor catalyst thereof, and the engine was operated for 1 hour at a constant speed of 40 km/hr such that the catalyst bed temperature was kept at 400° C. Next, the engine was accelerated under full-throttled condition to the speed of 110 km/hr in 10 seconds, and after this speed was kept for 10 seconds, the engine was decelerated and stopped in 20 seconds, and was kept idle for 10 seconds therefrom. The concentration of $H_2S$ contained in an exhaust gas while idling was measured, and the peak concentration was shown in Table 1 and FIG. 1.

(Test on Purification Performance)

The catalysts of each embodiment and each comparative example were respectively mounted on a vehicle equipped with a 2.4 L, in-line four-cylinder engine as an underfloor catalyst thereof, the combustion of the engine was controlled in the theoretical air-fuel ratio, and the purification rate of the HC components was measured while raising the temperature from 200° C. to 450° C. at a rate of 10° C. per minute via a heat exchanger. From the measurement results, the temperatures at which 50% of the HC components can be purified were calculated. The calculated results were shown in Table 1 and FIG. 2 as "THC 50% purification temperature".

And the catalysts of each embodiment and each comparative example were respectively mounted on an exhaust system of an engine bench equipped with a 4.0 L, V-type eight-cylinder engine, and a durability test was carried out by holding each catalyst at a catalyst bed temperature of 900° C. for 100 hours while alternating A/F=15 and A/F=14 with 1 Hz. The catalysts after the durability test were respectively mounted on a vehicle equipped with a 2.4 L, in-line four cylinder engine as an underfloor catalyst thereof, and the CO purification rate and the $NO_x$ purification rate were measured by analyzing the exhaust gas at the upstream and the downstream sides of the catalyst while sweeping the air-fuel ratio from 13.5 to 15.5 by varying the combustion conditions. The temperature of the gas entering the catalyst is 400° C. And the purification rate at the point where the CO purification curve and the $NO_x$ purification curve cross each other was determined as "CO—$NO_x$ cross purification rate", and is shown in Table 1 and FIG. 3.

TABLE 1

| | Amount of additional oxide (mol/L) | | | Ratio | Formation amount | THC50% purification | CO—$NO_x$ cross purification |
|---|---|---|---|---|---|---|---|
| | $Bi_2O_3$ | $SnO_2$ | ZnO | (R) | of $H_2S$ (ppm) | temperature (° C.) | rate (%) |
| Comparative example 1 | — | — | — | — | 300 | 340 | 96.2 |
| Embodiment 1 | 0.025 | — | — | 67.2 | 40 | 335 | 95.8 |
| Embodiment 2 | 0.05 | — | — | 33.2 | 25 | 332 | 96.5 |
| Embodiment 3 | 0.1 | — | — | 16.8 | 15 | 335 | 94.5 |
| Embodiment 4 | 0.2 | — | — | 8.4 | 10 | 370 | 93.5 |

TABLE 1-continued

|  | Amount of additional oxide (mol/L) | | | Ratio (R) | Formation amount of $H_2S$ (ppm) | THC50% purification temperature (° C.) | CO—$NO_x$ cross purification rate (%) |
| --- | --- | --- | --- | --- | --- | --- | --- |
|  | $Bi_2O_3$ | $SnO_2$ | ZnO |  |  |  |  |
| Comparative example 2 | 0.5 | — | — | 3.4 | 2 | 390 | 82 |
| Embodiment 5 | — | 0.05 | — | 33.4 | 23 | 340 | 96 |
| Embodiment 6 | — | 0.1 | — | 16.7 | 18 | 345 | 95.7 |
| Embodiment 7 | — | 0.2 | — | 8.3 | 8 | 350 | 94 |
| Comparative example 3 | — | 0.5 | — | 3.3 | 6 | 400 | 80 |
| Embodiment 8 | — | — | 0.05 | 33.8 | 20 | 334 | 95 |
| Embodiment 9 | — | — | 0.1 | 16.9 | 10 | 337 | 94.5 |
| Embodiment 10 | — | — | 0.2 | 8.4 | 4 | 341 | 94 |
| Comparative example 4 | — | — | 0.5 | 3.4 | 1 | 370 | 85 |
| Embodiment 11 | 0.05 | 0.05 | — | 67.0 | 11 | 341 | 94.7 |
| Embodiment 12 | 0.1 | — | 0.1 | 33.7 | 5 | 349 | 93.8 |
| Embodiment 13 | 0.1 | 0.1 | — | 33.5 | 7 | 355 | 93.6 |
| Embodiment 14 | — | 0.05 | 0.05 | 67.1 | 9 | 340 | 94.2 |
| Comparative example 5 | 0.3 | 0.2 | — | 13.9 | 0 | 395 | 83 |

Table 1 and FIGS. 1 and 2 clearly show that by adding the additional oxide composed of the oxide of at least one kind of metal selected from the group consisting of Bi, Sn and Zn, the formation of $H_2S$ can be restrained greatly.

And it has been also clarified that when the content of the additional oxide exceeds 0.2 mol per liter of the catalyst, the purification performance lowers, which clearly shows that by determining the content of the additional oxide to the range of 0.02~0.2 mol, the formation of $H_2S$ can be restrained while restraining the lowering of the three-way activity.

Furthermore, by adding the additional oxides composed of oxides of at least two kinds of metals selected from the group consisting of Bi, Sn and Zn such that the total amount is in the range of 0.02~0.2 mol, the formation amount of $H_2S$ tends to further lower, as compared with the case one kind of additional oxide is contained by an identical amount thereto. The reasons for this tendency have not been clarified, but it is considered that the elevation of the melting point of sulfides due to the existence of two kinds of the additional oxides is one of the reasons.

And it has been also clarified that the ratio R of the catalyst of each embodiment is in the range of 8<R<72, and more preferably, in the range of 12<R<45.

INDUSTRIAL APPLICABILITY

The catalyst for purifying an exhaust gas in accordance with the present invention is useful as the three-way catalyst for motor vehicles, but can be applied to other internal combustion engines than those for motor vehicles provided that the combustion is controlled in near a stoichiometric atmosphere.

The invention claimed is:

1. A catalyst for purifying an exhaust gas emitted from an internal combustion engine of which the combustion is controlled in near a stoichiometric atmosphere, said catalyst comprising:
   a platinum group metal;
   a porous oxide; and
   an additional oxide composed of oxides of at least two metals selected from the group consisting of Bi, Sn and Zn, said additional oxide being contained in the range of 0.1 mol-0.2 mol per liter of said catalyst.

2. A catalyst for purifying an exhaust gas, as claimed in claim 1, wherein the ratio (R) of the molar content of said porous oxide to the molar content of said additional oxide is in the range of 8<R<72.

3. A catalyst for purifying an exhaust gas, as claimed in claim 2, wherein said ratio is in the range of 12<R<45.

4. A catalyst for purifying an exhaust gas emitted from an internal combustion engine of which the combustion is controlled in near a stoichiometric atmosphere, said catalyst comprising:
   a platinum group metal;
   a porous oxide; and
   an additional oxide selected from the group consisting of $Bi_2O_3$+$SnO_2$, $Bi_2O_3$+ZnO, and $SnO_2$+ZnO, said additional oxide being contained in the range of 0.1 mol-0.2 mol per liter of said catalyst.

5. A catalyst for purifying an exhaust gas emitted from an internal combustion engine of which the combustion is controlled in near a stoichiometric atmosphere, said catalyst comprising:
   a platinum group metal;
   a porous oxide; and
   an additional oxide selected from the group consisting of $Bi_2O_3$+$SnO_2$ and $Bi_2O_3$+ZnO, said additional oxide being contained in the range of 0.1 mol-0.2 mol per liter of said catalyst.

* * * * *